United States Patent [19]
Aldrete et al.

[11] Patent Number: 5,484,131
[45] Date of Patent: Jan. 16, 1996

[54] TREE LEVELLING STAND

[76] Inventors: Michael T. Aldrete, 215 Brookside Dr., San Anselmo, Calif. 94960; Paul A. Lagomarsino, 840 Angus Ave. W., San Bruno, Calif. 94066

[21] Appl. No.: 350,279

[22] Filed: Dec. 5, 1994

[51] Int. Cl.$^6$ ............................................. F16M 13/00
[52] U.S. Cl. ........................... 248/527; 47/40.5; 248/515
[58] Field of Search ................................ 248/527, 523, 248/524, 515, 516; 47/40.5

[56] References Cited

U.S. PATENT DOCUMENTS

| | | | |
|---|---|---|---|
| 1,914,150 | 6/1933 | Muldoon . | |
| 2,416,802 | 3/1947 | Roung | 248/45 |
| 2,476,225 | 7/1949 | Schroeder | 248/47 |
| 2,893,668 | 7/1959 | Applegate | 248/523 X |
| 2,905,414 | 9/1959 | Zierden | 248/44 |
| 2,994,498 | 8/1961 | Sager | 248/44 |
| 3,026,075 | 3/1962 | Phelon et al. | 248/48 |
| 3,042,350 | 7/1962 | Lencioni | 248/45 |
| 3,298,642 | 1/1967 | Taylor | 248/523 X |
| 3,307,813 | 3/1967 | Pleiss | 248/527 X |
| 4,541,601 | 9/1985 | Corbisello | 248/527 X |
| 4,913,395 | 4/1990 | Juhas | 248/527 X |
| 5,074,514 | 12/1991 | Smith | 248/524 |
| 5,249,772 | 10/1993 | Montie, Jr. et al. | 248/523 |

FOREIGN PATENT DOCUMENTS

| | | | |
|---|---|---|---|
| 22993 | 1/1907 | Sweden | 47/40.5 |
| 60820 | 10/1925 | Sweden | 47/40.5 |

OTHER PUBLICATIONS

Frontgate advertisement No. 3965, "Christmas Tree Stand", Nov. 1, 1994.

*Primary Examiner*—J. Franklin Foss
*Attorney, Agent, or Firm*—Harvey J. Anderson; Limbach & Limbach

[57] ABSTRACT

The present invention comprises a tree stand, especially suitable for Christmas trees, for holding and adjusting the longitudinal angle of a tree trunk placed in the stand. The stand comprises a base member, a cup member, and a means for selectively adjusting and locking the tree trunk in the stand in a fixed angular orientation. The tree stand of the present invention allows a tree trunk placed in the stand to be easily levelled so that the tree is aesthetically pleasing, appearing perpendicular to a floor surface. The present invention also includes a method of using a tree stand, with or without a cup member, which provides a means to easily and efficiently adjust the angular orientation of a tree trunk. The present invention further provides a means to monitor the level of water contained in the cup member.

12 Claims, 4 Drawing Sheets

5,484,131

TREE LEVELLING STAND

BACKGROUND OF THE INVENTION

The invention described herein relates to the ornamental display of trees, particularly christmas trees or any tree which is not perpendicular to a horizontal floor surface.

Typically ornamental display trees are cut at the base of the trunk. The cutting is frequently uneven, resulting in a tree shaft that does not have a flat surface. When such a tree is placed in a conventional stand, or mounted on the floor, the tree does not stand "straight" or substantially perpendicular to the floor. This detracts from the aesthetic appeal of the tree. The tree shaft itself may also be crooked or have unsightly bends. Thus when the tree is placed on the floor or in a stand, the tree does not stand straight. This again detracts from the aesthetic appeal of the tree.

At the same time, it is necessary to provide a tree stand which supplies water to the base of the tree trunk located in the stand to preserve the freshness of the tree and prevent the tree from drying. A problem associated with the provision of water to the tree is that it is difficult to determine when water in the stand needs replenishing. Frequently, it is difficult to visually inspect the water level provided in the stand because branches of the tree and objects placed beneath the tree impede access to the conventional tree stand.

Various methods and devices are used to compensate for uneven trees caused by poor cuts or inherent bends in the shaft. For example, as shown in U.S. Pat. Nos. 2,994,498 ("Sager") and 3,026,075 ("Phelon et al"), a set of centering screws are sometimes used to adjust the angle of vertical axis of a tree relative to the floor. This method is ineffective and cumbersome. These devices require multiple adjustments, and because the tree shafts are fixedly mounted on a center pin in a non-rotatable cup member, only limited vertical adjustments can be made.

Another common method of levelling a tree is to place shims underneath a portion of the stand itself to offset the height of one side of the stand. This method is disadvantageous because it requires additional elements, namely shims, and because it destabilizes the support stand. This method also requires a series of inefficient and time consuming attempts to find the shim of the proper thickness to provide the needed offset of the stand. Furthermore, this method may also result in a tree support position which causes water contained in the base to spill.

Other devices, such as the one disclosed in U.S. Pat. No. 3,042,350 ("Lencioni"), provide rotation of a tree around a vertical axis, but they do not provide angular displacement such that a tree may be easily and efficiently levelled resulting in an aesthetically appealing tree, positioned nearly perpendicularly to the floor.

It is therefore an object of the present invention to provide a tree stand which simplifies the levelling of the tree. A further object is to provide a means to indicate when additional water must be placed in the tree stand.

SUMMARY OF THE INVENTION

The present invention consists of a tree stand comprising a base member adapted to be supported on a floor and having an upwardly facing recess opening formed therein, a cup member having a longitudinal axis received within the recess opening of the base member for movement to alter the angle of the longitudinal axis relative to the base member, a means to secure a tree trunk within the cup, and a means to selectively adjust and lock the cup within the recess opening at different angular orientations of the longitudinal axis relative to the base member.

In the present invention fulcrum surfaces are provided within the recess opening. By this means, the cup member pivots against the fulcrum surfaces thereby providing angular rotation of the longitudinal axis of the cup member relative to the base. A locking means comprising a projection extending from the cup through at least a portion of the base member and a clamp member moveable along the projection for clamping engagement with said portion is provided to maintain the cup member in a fixed angular position. A battery powered micro chip and LED is also incorporated into the stand such that when water contained in the cup member reaches a predetermined level, the micro chip initializes the LED, thereby indicating that the water contained therein needs to be replenished.

DETAILED DESCRIPTION OF THE INVENTION

Figure 1:
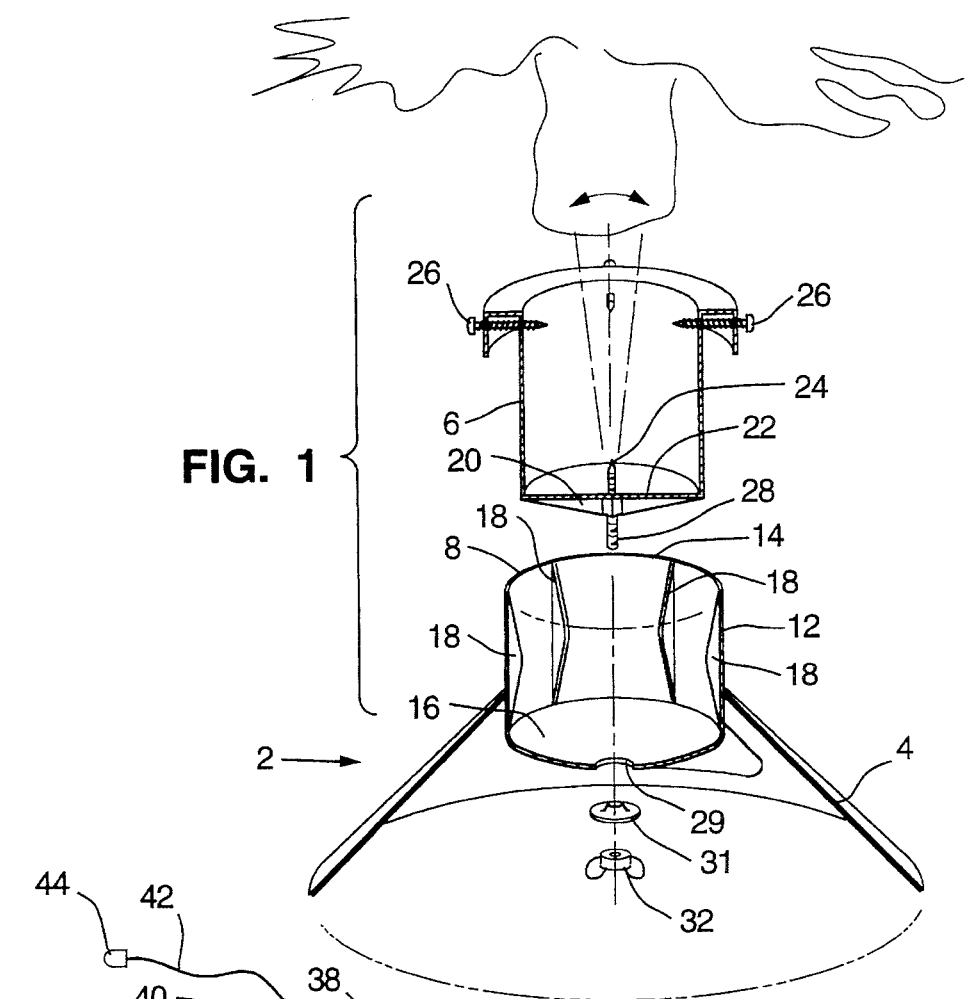
FIG. 1 is an exploded cross-sectional perspective view showing the tree stand of the present invention.

As shown in FIG. 1, the tree stand 2 of the present invention comprises a base member 4 configured to receive a cup member 6, a means to selectively adjust and lock the angular position of the cup member 6, and a means for monitoring water contained in the cup member 6.

In the embodiment shown in FIG. 1, the base member 4 of the stand is frusto-conical in shape and formed of a metallic, plastic, or rubber material with sufficient strength to support a tree. The base member 4 is further adapted to be placed on a floor or on a flat horizontal surface. The base member 4 may be rectangular, conical, oval, or triangular, but it is important that the base member 4 be constructed such that it can support the weight of the tree without the tree tipping over. In the preferred embodiment, the outer diameter of the base member 4 is 22 inches. The base member 4 may also be constructed with a counterweight to stabilize the stand and offset the weight of the tree.

The base member 4 has a recess opening 8 configured to receive the cup member 6 and an access hole 10 to an interior cavity of the base member 4. In the embodiment shown in FIGS. 1 and 2, a neck member 12 extends from the recess opening 8. The recess opening 8 is sized to receive the cup member 6 which may be angularly rotated within the recess opening 8. The recess opening 8 is part of the base member 4 and is formed to laterally and vertically support the cup member 6.

Figure 5:
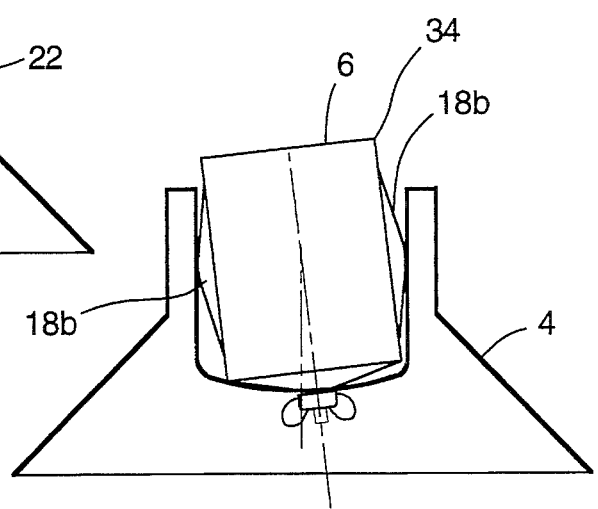
FIG. 5 is a cross-sectional diagram showing the cup member having flanges attached to the exterior of the cup member.

An interior surface 14 and a bottom surface 16 define a cavity within the recess opening 8. A plurality of projections 18 extend from the interior surface 14 of the recess opening 8. In the preferred embodiment shown in FIG. 2, the projections 18 are flanges connected to the interior surface 14 of the recess opening 8 such that the cup member 6 is laterally supported by the flanges in the recess opening 8. These projections 18 extend from the interior surface 14 such that they contact the cup member 6 alternatively, as shown in FIG. 5, projections 18b may be integrally formed on the cup member 6 and the interior surface of the cup member 6 may be of a smooth cylindrical configuration. The projections 18 are formed in a triangular or curved shape such that the portion of the flange which contacts the cup member 6 acts as a fulcrum about which the cup member 6 rotates. In the preferred embodiment, there are at least six equally spaced projections 18 formed on the interior surface 14 of the recess opening 8, 3" below the top of the neck member 12, which provide lateral support for the cup member 6. Other embodiments may use greater or fewer flanges.

Figure 2:
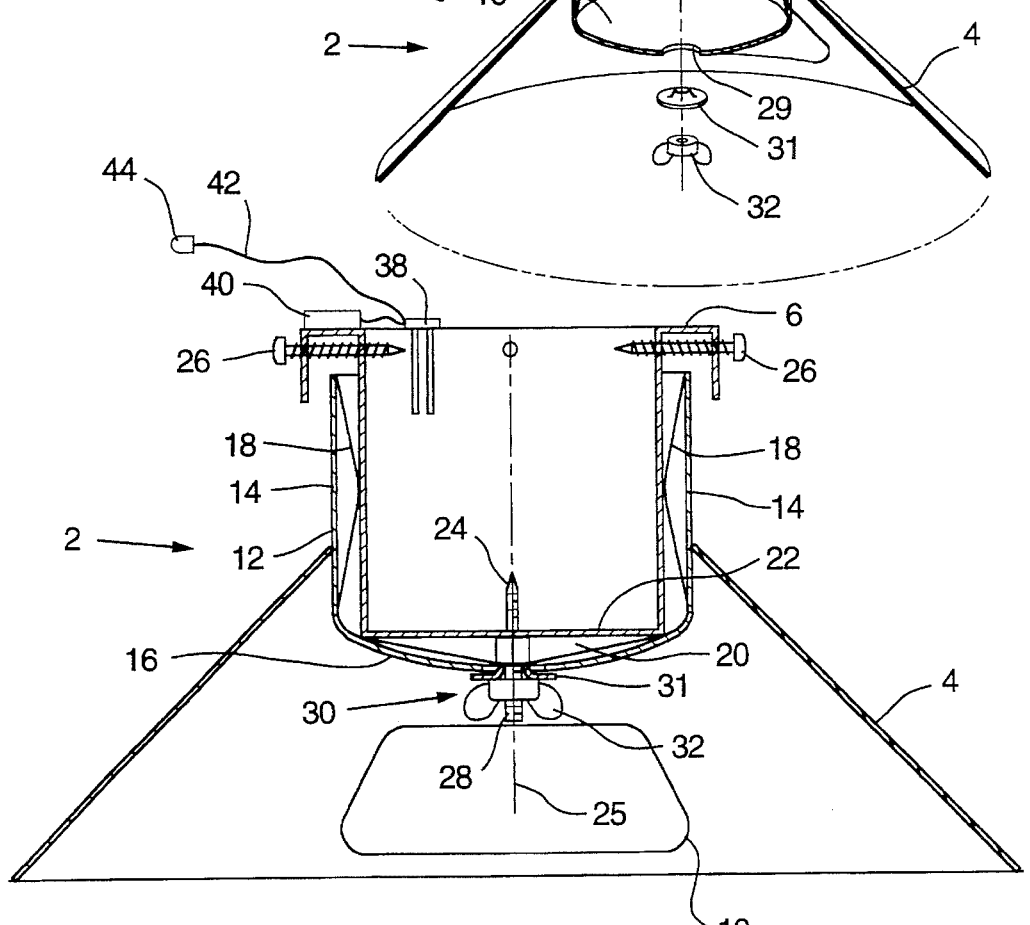
FIG. 2 is a cross-sectional view of the base member and the cup member.
Figure 7A:
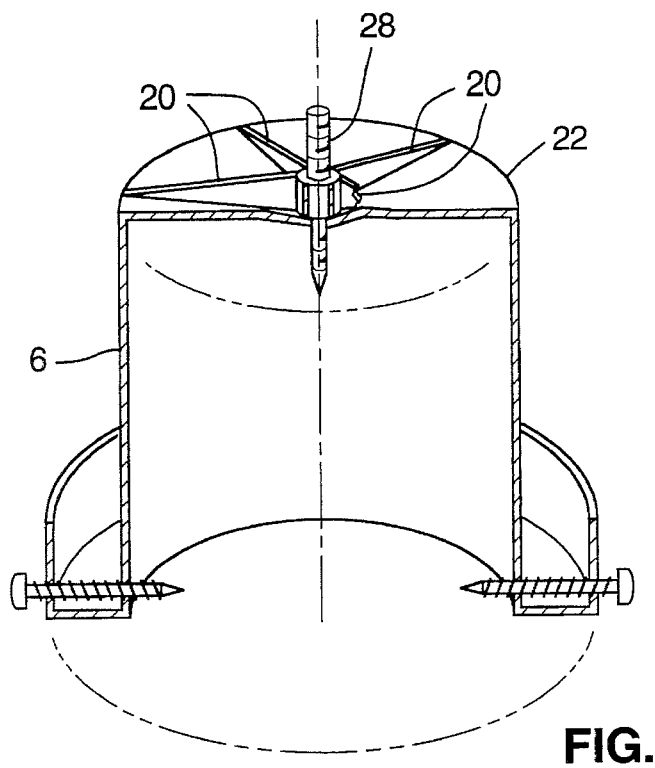
FIG. 7A is an upside down cross-sectional perspective view of the cup member.
Figure 7B:
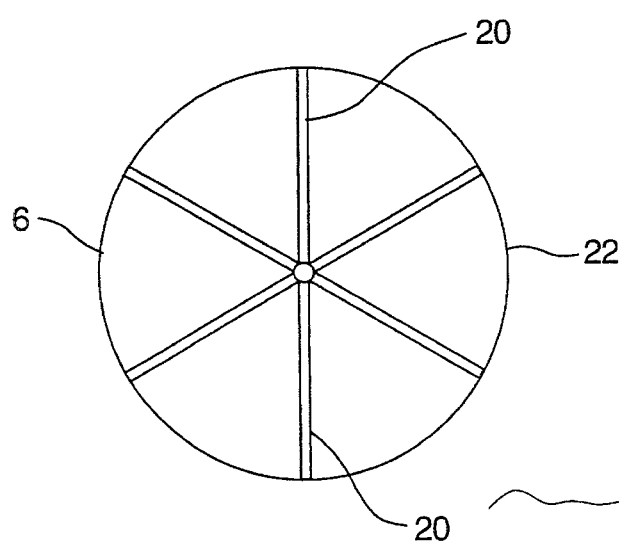
FIG. 7B is a bottom plan view of the cup member bottom.

FIG. 2 also shows a bottom projection 20 formed on a cup member bottom 22 which contacts the recess bottom 16. The bottom projection 20 supports the cup member 6 and further provides for angular rotation of the cup member 6 within the recess opening 8. In the preferred embodiment, the bottom projection 20 is formed as a series of tapered flanges, as shown in FIGS. 7A and 7B, in a triangular shape.

Referring again to FIGS. 1 and 2, the cup member 6 is formed to fit securely around the tree trunk. The cup member 6 has a pin projection 24 on the cup bottom 22 which projects into the shaft of the tree trunk when the tree trunk is inserted into the cup member 6. The pin projection 24 is 1" long and ⅛" wide and partially threaded. A plurality of conventional thumbscrews 26 extend threadably through the open end of the cup member 6 to secure the tree trunk in the cup member 6. The cup member 6 is constructed such that it can contain water. The cup member 6 is made of rubber, plastic or metal, but it must have sufficient strength and integrity to hold water and to support the tree.

Figure 3A:
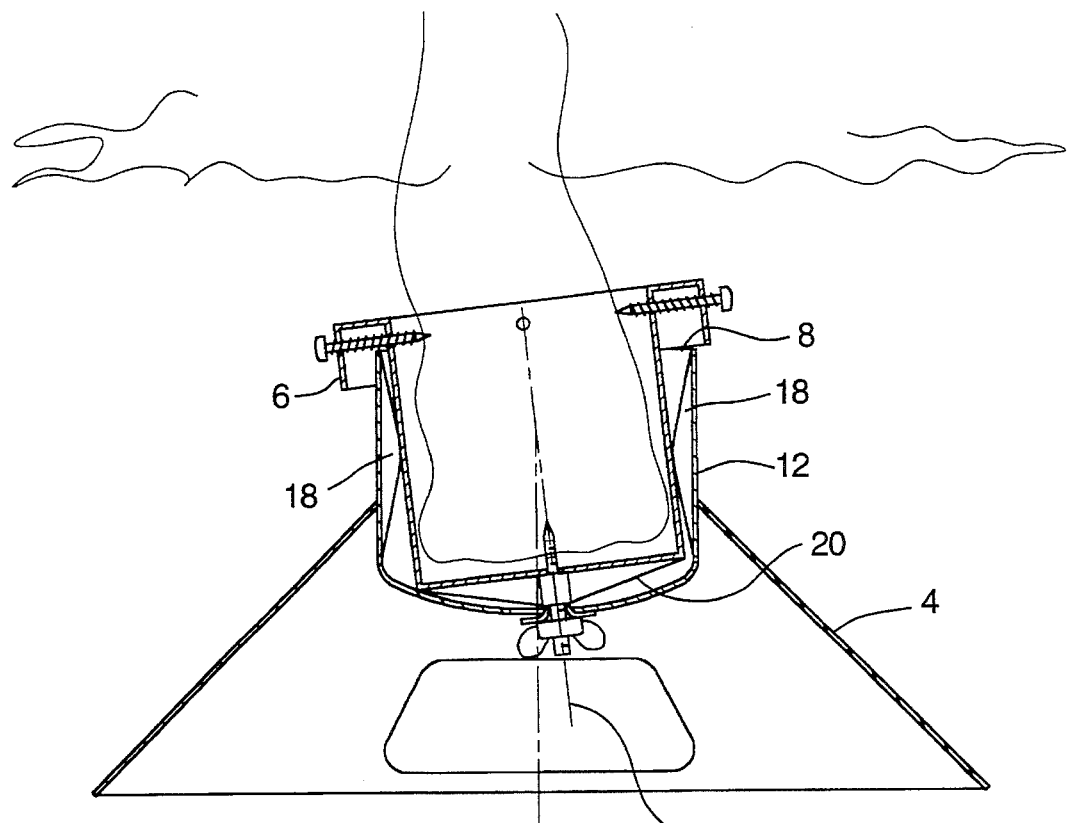
FIG. 3A is a cross-sectional view similar to FIG. 2 showing the cup member in a first angular position.
Figure 3B:
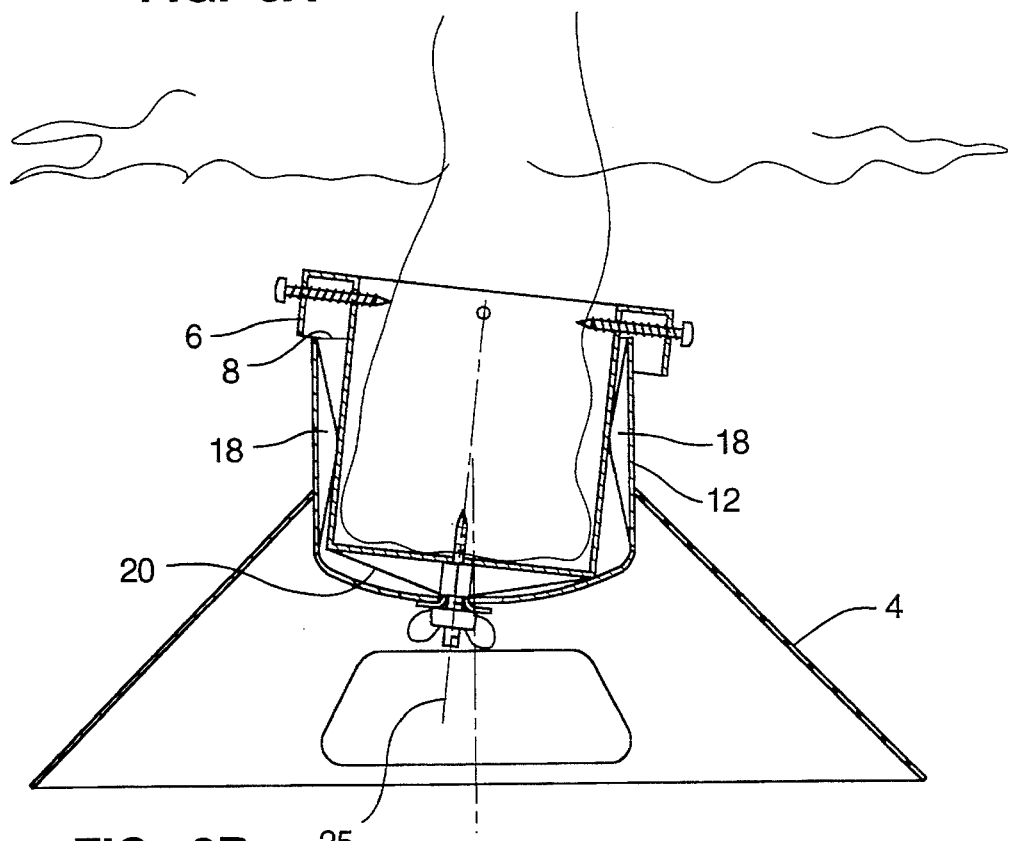
FIG. 3B is a cross-sectional view similar to FIG. 2 showing the cup member in a second angular position.

The cup member 6 is disengageable from the base member 4 so that the tree trunk may be inserted into the cup member 6. As shown in FIG. 3, the cup member 6 is rotatably coupled within the recess opening 8 of the base member 4 such that it may be angularly rotated. The cup member 6 has a longitudinal axis 25. The angle of the longitudinal axis 25 relative to the base member 4 is adjusted by rotating the cup member 6 within the recess opening 8 against the projections 18 which act as fulcrum points about which the cup member 6 and its longitudinal axis 25, pivot.

The bottom projection 20 formed on the cup bottom 22 cooperates with the bottom surface of the recess opening 16 thereby providing a swivel surface for rotation of the cup member 6. As shown in FIGS. 7A and 7B, the bottom projection 20 comprises six equally spaced wedges measuring ½" at center tapering 2⅝" to 0" at the outer edge (See FIGS. 7A and 7B). In another embodiment, rotation of the cup member 6 may also be accomplished by a curved bottom surface of the recess opening 16 which cooperates with a corresponding curve in the cup bottom 22 or the bottom projections 22.

In the present invention, the means to selectively adjust the cup member 6 within the recess opening 8 at different angular orientations of the longitudinal axis 26 relative to the base member 4 comprises the projections 18 and the bottom projections 22 cooperating with the cup member 6. The projections 18 formed as flanges are made of steel, however, they may be made of any other suitable material which would provide sufficient strength to support the cup member 6. As shown in FIGS. 1 and 2, the projections 18 are triangular in shape such that the projection tapers from a first height at a middle point to a second height at the distal end of the projection.

Referring again to FIGS. 1 and 2, the means to lock the cup member 6 in a fixed angular position comprises a conventional 1" long, ⁵⁄₁₆" wide, coarse threaded bolt member 28 which extends from the cup bottom 22 through a throughole 29 formed in the recess bottom 16. The throughole 29 is larger in diameter than the threaded bolt 28 such that the bolt 28 may be rotated in an angular fashion. A clamping member 30 consisting of a conventional 1¼" metal washer 31 that matches the curve of the recess bottom 16 and a conventional wingnut 32 are coupled to the bolt member 28. The bolt 28 and washer 31 are screwed on the bolt member 28 such that they press against the recess bottom 16 thereby fixedly holding the cup member 6 in a set angular position. This angular position corresponds to the aesthetic desires of the user to account for bends in the tree trunk or irregularities in the tree shape such that the tree appears straight. The locking means is reached by the user through the access hole 10.

Figure 4:
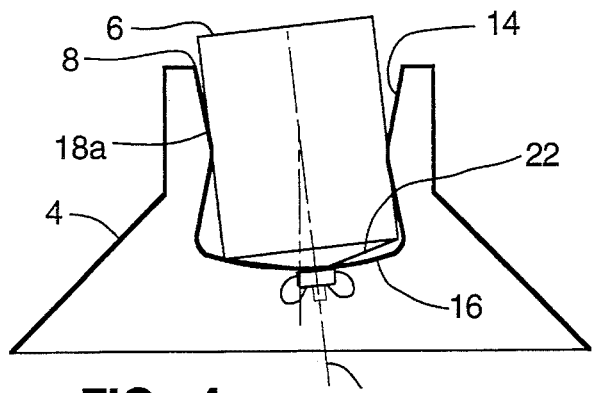
FIG. 4 is a cross-sectional diagram showing the cup member mounted in a base member having fulcrum surfaces.

FIG. 4 shows another embodiment of the present invention in which the projections 18a are integrally formed with the interior surface 14 of the recess opening 8 such that the projections 18a provide annular fulcrum surfaces about which the cup member 6 may be rotated to change the angular orientation of the cup member 6. The recess bottom 16 is also formed in a curved shape so that it may cooperate with the cup bottom 22 upon rotation.

Figure 6A:
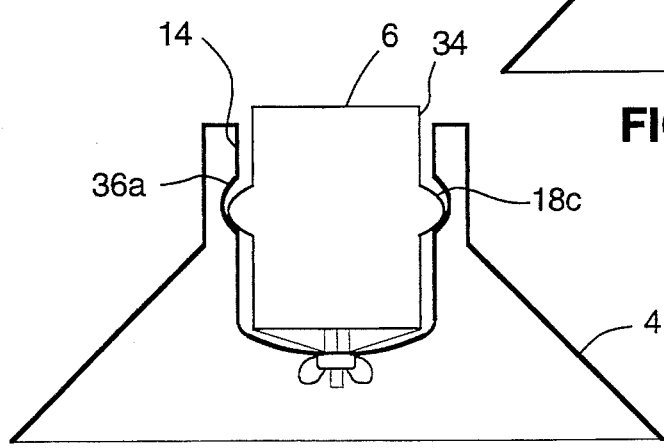
FIG. 6A is a cross-sectional diagram showing the cup member with an annular rib.
Figure 6B:
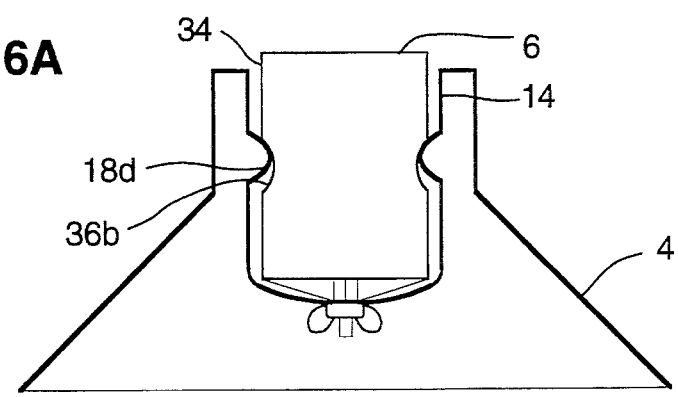
FIG. 6B is a cross-sectional diagram showing the cup member having an annular groove cooperating with an annular rib formed on the base member.
Figure 6C:
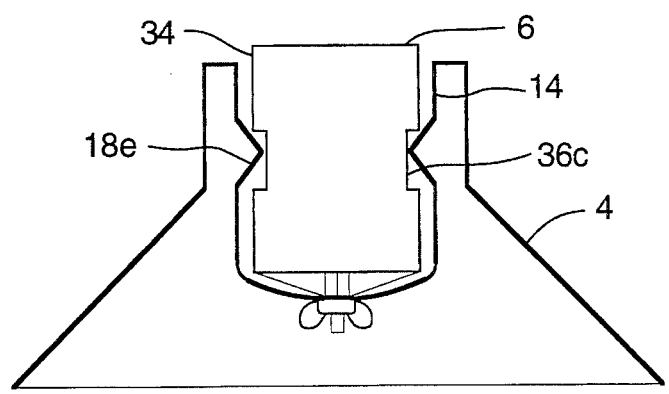
FIG. 6C is a cross-sectional diagram showing a snap-in embodiment of the tree stand of the present invention wherein projections extend from the interior surface of the recess opening into a cooperating recess formed on the cup member.

FIG. 5 shows another embodiment wherein the projections 18b which provide angular displacement of the cup member 6 are affixed to an exterior surface 34 of the cup member 6. As described above, the projections 18 may be flanges in a triangular or curved shape. As shown in FIG. 6A, the projections 18c may also be an annular rib formed on the cup member extending into a cooperating groove 36a formed on the interior surface 14. As shown in FIG. 6B, the projections 18d may be formed on the interior surface 14 such that they extend into a cooperating groove 36b formed on the cup member 6. The projections 18e may also be formed as triangular projections extending from the interior surface 14 into a cooperating groove 36c formed on the cup member 6 (see FIG. 6C). These projections 18a, 18b, 18c, 18d, and 18e provide fulcrum points about which the cup member 6 angularly rotates.

Figure 8:
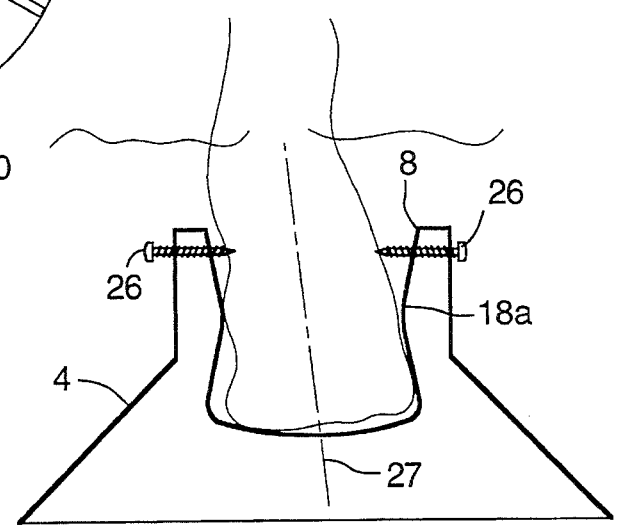
FIG. 8 is a cross-sectional diagram similar to FIG. 4 showing a tree, without the cup member, placed in base member having fulcrum surfaces.

As shown in FIG. 8, a method of using the present invention without the cup member 6 is provided. First, the tree trunk is placed in the recess opening 8. Second, the angle of the longitudinal axis 27 of the tree relative to the base member 4 is selected and adjusted by rotating the tree trunk against the fulcrum surfaces 18a. Third, the tree is locked in a fixed angular position within the base member 4 by a conventional locking means such as thumb screws 26 threadably extending through the open end of the recess opening 8.

In all of the above embodiments the cup member 6 is formed such that it can contain water without letting the water leak into the base member 4. When the tree is placed in the cup member 6 containing water, the water is absorbed by the tree trunk thereby preserving and extending the freshness of the tree. As shown in FIG. 2 the means for monitoring the water level comprises a conventional micro chip 38, a battery 40, a wire 42, and a LED indicator light 44. The micro chip 38 is powered by the battery 40 and when the water reaches a predetermined level the micro chip 38 initializes the LED 44 by opening an electrical circuit containing the LED 44 and the battery 40. The LED 44 is thereby illuminated indicating that water needs to be added to the cup member 6. Other comparable water level indicators may also be used such as mechanical indicators which float on the water and when the water reaches the bottom of the cup member 6 a circuit is initialized which causes the LED 44 to blink or illuminate.

The specific embodiments herein shown and described should be considered as illustrative only. Various changes in structure will, no doubt, occur to those skilled in the art and these changes are to be understood as forming a part of this invention insofar as they fall within the spirit and scope of the appended claims.

What is claimed is:

1. A tree stand comprising:
   a base member adapted to be supported on a floor and having an upwardly facing recess opening formed therein;
   a cup member having a longitudinal axis received within the recess opening of the base member for movement to alter the angle of the longitudinal axis relative to the base member;
   means to secure a tree within the cup member; and
   means to selectively adjust and lock the cup member within the recess opening at different angular orientations of the longitudinal axis relative to the base member,
   wherein the adjustment means comprises a fulcrum surface within the recess opening for engagement with the cup member to enable the cup member to be displaced by the fulcrum surface causing a change in the angular orientation of the cup member longitudinal axis relative to the base member.

2. A stand according to claim 1, wherein the adjustment and locking means comprises a projection extending from the cup member through at least a portion of the base member and a clamp member moveable along the projection for clamping engagement with said portion.

3. A stand according to claim 1, wherein: the fulcrum surface comprises a plurality of projections formed between the cup member and the base member.

4. A stand according to claim 3, wherein: the projections are flanges.

5. A stand according to claim 4, wherein: the projections are an annular rib.

6. A tree stand for holding and levelling a tree trunk, comprising:
   a base member adapted to be supported on a floor and having an upwardly facing recess opening formed therein;
   a neck member having a bottom, an interior surface, and an exterior surface, the neck member extending through the recess opening;
   a cup member rotatably coupled within the neck member, the cup member including a longitudinal axis and an exterior surface, the cup member further including a bottom;
   at least one projection extending between the interior surface of the neck member and the exterior surface of the cup member such that the cup member is supported within the neck member for movement about a fulcrum provided by the projection; and
   means to selectively lock the cup member within the neck member at different angular orientations of the longitudinal axis relative to the base member.

7. The tree stand of claim 6 wherein: the projection extends from the cup bottom against the neck bottom such that the longitudinal axis of the cup member may be adjusted relative to the base member.

8. The tree stand of claim 6, wherein: the projection is a plurality of flanges.

9. The tree stand of claim 6, wherein the means to selectively lock comprises: a bolt member extending from the cup bottom through at least a portion of the neck bottom and a clamp member moveable along the bolt member for clamping engagement with said portion.

10. The tree stand of claim 6, further comprising: means for monitoring a level of water contained in the cup member such that when the water level reaches a predetermined level, an indicator light is initialized.

11. A tree stand according to claim 1, wherein: the fulcrum surface comprises a curved projection on the cup member and a curved surface on the recess opening.

12. A tree stand comprising:
   a base member adapted to be supported on a floor and having an upwardly facing recess opening formed therein, the recess opening having at least a partially curved sidewall;
   a cup member having a curved portion and a longitudinal axis, the cup member being at least partially received within the recess opening, the curved portion contacting the curved sidewall; and
   means for adjusting the angular orientation of the longitudinal axis relative to the base member, said adjustment means including a fulcrum surface formed between the curved portion and the curved sidewall; and
   means to secure a tree within the cup member.

* * * * *